United States Patent [19]
Hilsenbeck et al.

[11] Patent Number: 5,062,448
[45] Date of Patent: Nov. 5, 1991

[54] DOUBLE ACTION CHECK VALVE

[75] Inventors: Henry Hilsenbeck, 9951 Sunrise Blvd. R-8, North Royalton, Ohio 44133; Jack E. Muck, Brookpark, Ohio

[73] Assignee: Henry Hilsenbeck, Cleveland, Ohio

[21] Appl. No.: 537,584

[22] Filed: Jun. 14, 1990

[51] Int. Cl.5 .............................................. F16K 17/26
[52] U.S. Cl. ..................................... 137/498; 137/504
[58] Field of Search ............... 137/504, 517, 516.25, 137/512.15, 493.9, 460, 498, 859, 513

[56] References Cited
U.S. PATENT DOCUMENTS

| 2,992,652 | 7/1961 | Fellberg | 137/859 X |
| 3,085,589 | 4/1963 | Sands | 137/516.25 X |
| 3,734,115 | 5/1973 | McMath | 137/517 X |
| 4,141,379 | 2/1979 | Manske | 137/517 X |
| 4,186,768 | 2/1980 | Kuester | 137/516.25 |
| 4,196,753 | 4/1980 | Hammarstedt | 137/504 X |

FOREIGN PATENT DOCUMENTS 7905009 12/1980 Netherlands ..................... 137/498

Primary Examiner—Stephen M. Hepperle
Attorney, Agent, or Firm—J. Helen Slough

[57] ABSTRACT

A Double Action Check Valve is shown provided with a flexible membrane secured between the inlet and outlet members, the membrane having apertures or orifices interiorly of the perimeter; substantially ball-shaped members centrally carried on either side of the membrane and under increased volume of flow from the inlet or outlet side of the ball-shaped members carried by it move in concert with the membrane as the membrane is caused to bow out or flex on either side of the coupling member as dictated by the volume of flow.

6 Claims, 2 Drawing Sheets

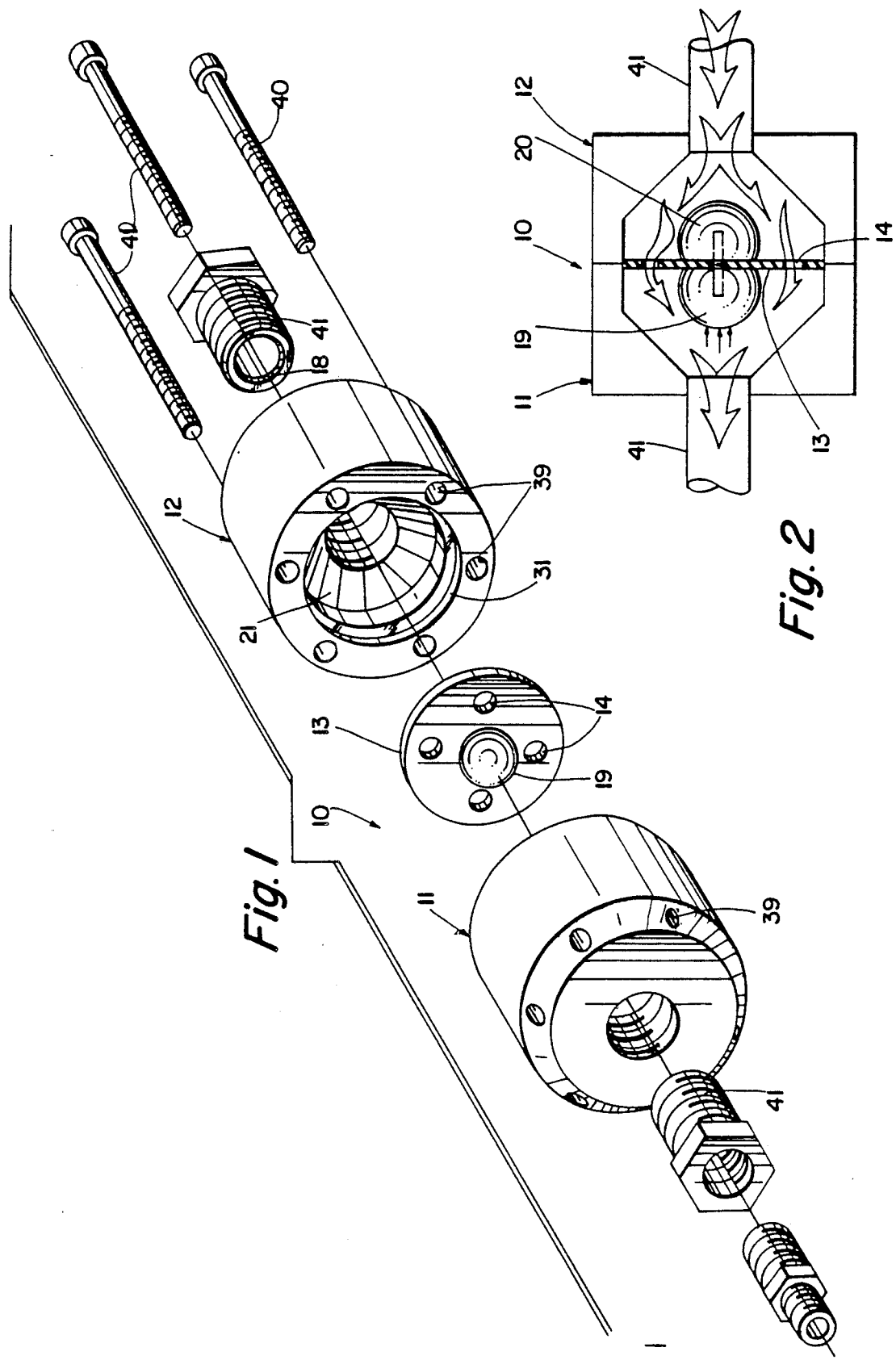

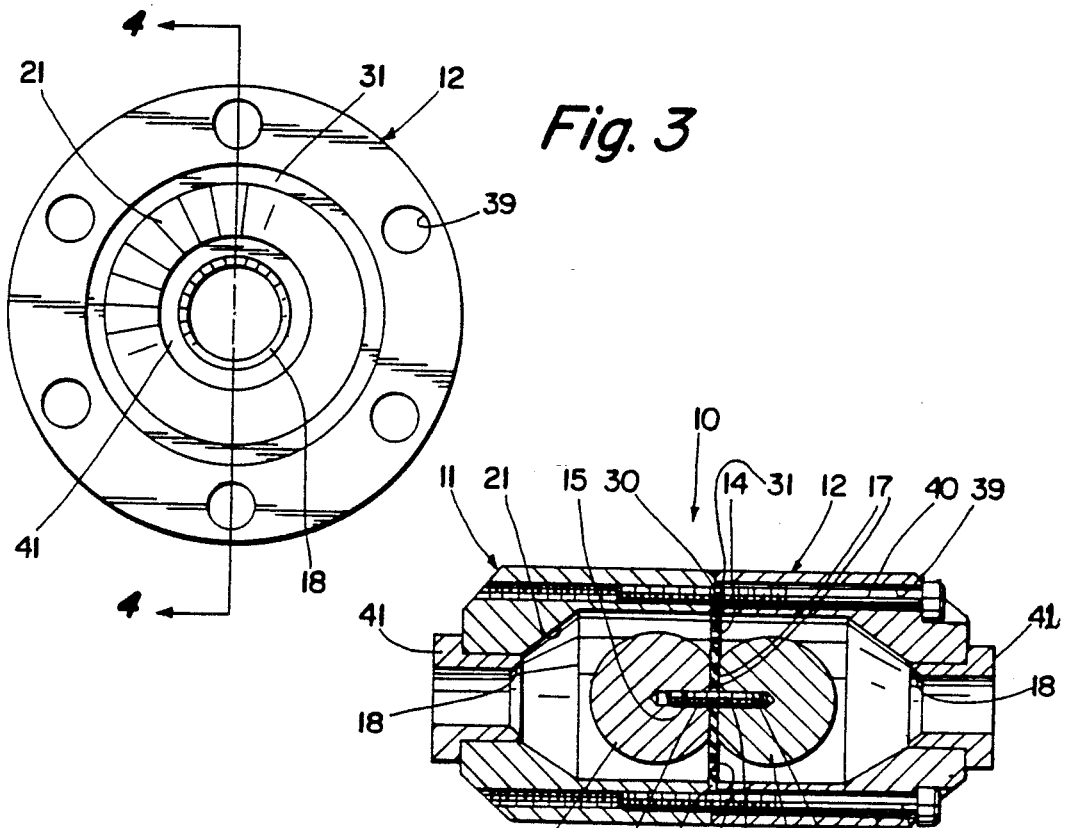
Fig. 3
Fig. 4
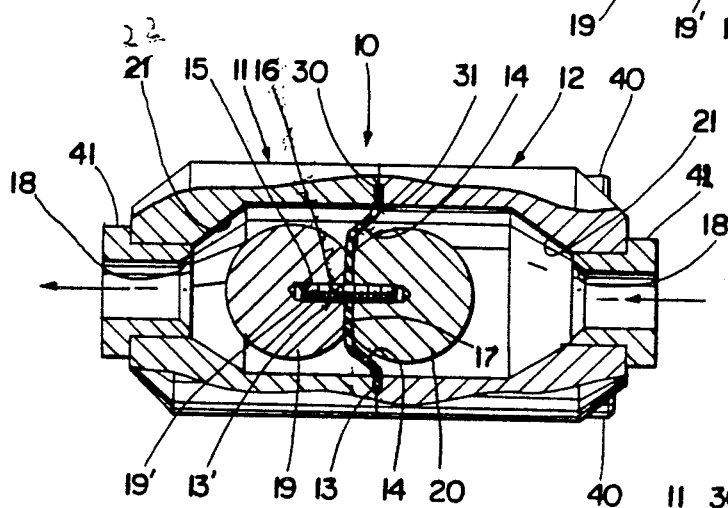
Fig. 5
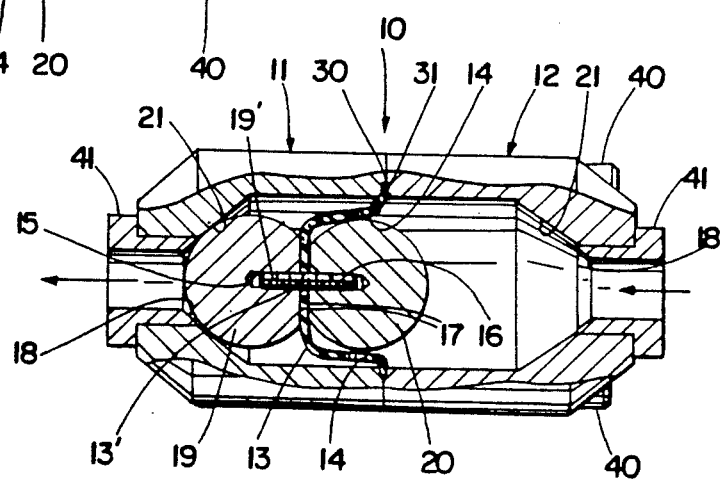
Fig. 6

DOUBLE ACTION CHECK VALVE

FIELD OF THE INVENTION

This invention relates to a double action check valve adapted for use in controlling the flow of air, gases, and liquids through a line through which the same flows.

BACKGROUND OF INVENTION

Varied types of valving mechanisms have been used for sealing a line through which gases and liquids and air flow to prevent reverse flow of gases, air or fluids therethrough. In the past U. S. Letters have disclosed flexible disk-like valves with a series of apertures spaced inwardly of the peripheral edge of a convex shaped disk viz. U.S. Pat. No. 2,674,262 to Bradshaw and U.S. Pat. No. 4,188,978 to DeLorenzo. The valve mechanisms disclosed in the above mentioned prior art U.S. Patents operate under reverse or backflow conditions.

The object of this invention is to produce a double action check valve which controls the flow of gases or liquids in both directions and when a sudden change in volume occurs the back pressure drops thereby closing the valve.

SUMMARY OF THE INVENTION

The present invention relates to a double action check valve adapted to control the flow of air, gases and liquids through piping or other conduit in both directions as opposed to check valves presently known which are one-directional. The double action check valve of this invention uses energy created from the flow of materials passing through the valve and said energy provides back pressure at the exit end of the valve to hold a flexible membrane open which is disposed between inlet and outlet members of a coupling member which coupling is composed of metal or other suitable material. The membrane is flexible and provided with spaced apertures or orifices interiorly of the perimeter of the membrane or diaphragm and about the center portion thereof.

The center portion of the membrane is provided with substantially ball-shaped members on either side of the same which are adapted to be disposed evenly on either side of the coupling members when the membrane is unflexed and the flow is constant on either side of the coupling and move in concert with the membrane as it is caused to bow out or flex on either side of the coupling member as dictated by the volume of flow of air, gases or fluids through the coupling. The double action check valve of this invention works the same in both directions of flow, i.e. in through or back reverse flow. The valve is also adapted to close by bowing of the membrane and seating of one of the sphere-shaped valve members in sealing means in the line in the event the supply line breaks shutting off further flow. These and other objects of the invention and its advantages will become more readily apparent from reference to the specification and accompanying drawings.

BRIEF DESCRIPTION OF THE DRAWINGS

FIG. 1: is an exploded view of the valve housing and connecting parts;

FIG. 2: is a top plan view of the housing of FIG. 1 as assembled and having directional flow pattern indicated thereon;

FIG. 3: is a top plan view of either inlet or outlet of the coupling;

FIG. 4 is a sectional view taken from the line 4—4 of FIG. 3;

FIG. 5: is a sectional view showing the valve of the present invention operating in one flow direction;

FIG. 6: is a view similar to FIG. 5 but snowing the valve closed.

DESCRIPTION OF THE PREFERRED EMBODIMENT

Reference is now made to the Figures of drawings, which illustrate a preferred embodiment of the invention, and in which like parts are designated by like reference characters.

As illustrated in FIG. 1, the double action check valve of the preferred embodiment comprises a coupling 10, a circular membrane 13, and inlet and outlet valve members 19 and 20. The coupling 10 is comprised of four parts, viz. an inlet member 11, an outlet member 12, and inlet sealing member 41, and an outlet sealing member 41. The outlet and inlet members 11 and 12 are circular in outer form and provided with conical truncated shaped passages tapered in the direction of flow and said members are connected by screws 40 through openings 39 in the outer periphery of the coupling inlet and outlet members as indicated in FIG. 1. The circular membrane 13 is preferably constructed of rubber, neoprene, plastic, or other flexible material, and located, as shown, between the inlet and outlet members 11 and 12 in matching circular grooves 30 and 31 and the circular membrane 13 is provided with a plurality of spaced apertures 14 about the perimeter of the same. The center of said membrane is apertured at 13' to provide for connection of sphere shaped valve members 19 and 20 thereto and for movement of each in an inlet and outlet coupling member 11 or 12 as dictated by the flow through the apertures of air, gases, fluids or the like on either side of the coupling. Connection of the valve members to the membrane 13 is provided by the insertion of a threaded rod 19' through a central opening 13' in the membrane and aligned topped threaded openings 15 and 16 in the valve members 19 and 20. The valve members are, as shown, preferably of substantially spherical or ball-like shape and provided with membrane facing truncated flat bottom surfaces 17. The substantially ball-shaped valve members 19 and 20 are adapted to be brought up tight against central portions of the membrane 13, as shown in FIG. 4; hence, when the membrane 13 is moved or bowed in either direction, the valve members 19 and 20 move with it. The valve members 19 and 20 are, as stated hereinbefore, in the preferred embodiment of this invention, provided with flat bottom surfaces 17 wherefor the members each fit tightly against opposite central portions of the membrane 13 and work in concert with it. As shown the valve members 19 and 20 are caused to move outwardly into the passages in the inlet and outlet valve members, as shown in FIGS. 4, 5, and 6.

FIG. 3 discloses a top view of either the inlet or outlet portion of the coupling 10, as shown both the inlet portion and the outlet coupling portions are identical. The circular membrane 13 is secured to the coupling 10 at the membrane perimeter. There are, of course, many ways known in the art to hold the membrane in place near the middle of the valve. In the preferred embodiment, the inlet member 11 and the outlet member 12 are secured together by screws 40 that pass completely through the outlet member 12 and partially into the inlet member 11.

FIG. 4 in conjunction with FIG. 1 best illustrates the construction of the coupling 10. FIG. 4 shows the inlet and outlet sealing members 41 disposed in cylindrical shaped passages in the couplings. In the preferred embodiment, as illustrated in FIG. 1, these members are threaded so that they can be attached to line or pipe carrying gas or liquids. There are, of course, many ways known in the art to attach the inlet and outlet sealing members 41 to a line or pipe for carrying gas or liquids. The inlet member at area 21 and at area 22 is tapered toward the outlet sealing member and is designed to force material either into the inlet or outlet sealing members towards the inlet sealing member. In the preferred embodiment all four members of the coupling 10 are made of metal; however, they could be made of plastic, rubber, glass, ceramic, or any suitable material. As shown in FIG. 1, all four members of the coupling are separate parts; however, the inlet side consisting of the inlet sealing member 41 and the member 11 or the outlet side consisting of the outlet member 12, and the outlet sealing member 41 could be cast as a single piece.

FIG. 2 illustrates how the double action check valve works. The liquid or gas enters the inlet sealing member 41, then passes into the inlet sealing member 11 of the coupling and flows around the inlet valve member 19 and through the apertures 14 in the membrane 13 and into the outlet sealing member 12, and around the outlet valve member 20 and passes out of the outlet through the outlet sealing member 41.

FIG. 2 illustrates the flow of fluids and gases through the valve at an approximately constant rate; the coupling 10, the membrane 13 and the outlet valve member 11 have been designed so that the energy of the flow creates a back pressure on the outlet sealing member 19. This back pressure offsets the pressure caused by the flow on the inlet sealing member 20, thus, the membrane 13 stays flat and the valve stays open. When there is a sudden change in the volume of the flow of the fluid or gas through the valve, the back pressure is relieved and the membrane 13 bows out. As the membrane 13 bows out and the outlet valve member 20 begins to move towards the outlet sealing member 41 the ball shaped valve member moves down stream in the passage in the outlet member 11, which, because of its pressure reduces the flow of the liquid or gas. In the preferred embodiment if the change in the volume of the flow is occasioned by a break in the line, energy is released thereby eliminating a back pressure on the outlet valve member 19 which seats against the outlet sealing member 41, as shown in FIG. 6, and shuts off further flow. FIG. 6 shows the valve seating in such latter event.

It will be noted that the bowing of the membrane because of increased volume flow not only disposes one of the valve members 19 and 20 toward the inlet or outlet side but moves the other valve member in the passage in the other coupling member to equalize the flow.

Although but one embodiment of this invention has been illustrated and described, it is to be understood by one skilled in the art that numerous changes and modifications may be made in the valve shown and described without departing from the spirit and scope of the claimed invention. Accordingly that scope is intended to be limited only by the scope of the appending claims.

We claim:
1. A valve comprising:
   a) a coupling comprising an inlet and outlet member, said coupling members being rigidly secured together, fluids and gases being adapted to flow through said members;
   b) a flexible membrane seating in the coupling members, said flexible membrane being provided with spaced apertures about the perimeter of the membrane and inwardly of the seating thereof, liquids or gases passing through the apertures in the membrane; and
   c) valve members carried on either side of the flexible membrane adapted to moderate the flow through the apertures in either direction of the flow and said valve members are truncated spheres with flat bottoms.
2. A valve as in claim 1 wherein;
   a) the sealing members have a cylindrical passage for the liquid or gas, said passage being tapered on the end which faces the membrane and the opposite end of which is adapted to be secured to a line or pipe.
3. A valve as in claim 2 wherein;
   a) the flexible membrane is made of rubber.
4. A valve as in claim 3 wherein;
   a) the valve members are made of hard rubber.
5. A valve as in claim 4 wherein;
   the inlet member and outlet member of the coupling are secured by bolts.
6. A valve comprising:
   a) a coupling comprising an inlet and outlet member, said coupling members being rigidly secured together, fluid or gases being adapted to flow through said members;
   b) a flexible membrane seated in the coupling members, said membrane being provided with spaced apertures about the perimeter of the membrane and inwardly of the seating thereof, liquid or gases passing through the apertures in the membrane;
   c) valve members carried on either side of the flexible membrane adapted to moderate flow through the apertures in either direction of flow;
   d) a sealing member mounted on each of the outer ends of the coupling member, the flexible members being unflexed when the volume of liquid or gas flowing through the coupling remains constant;
   e) the flexible membrane flexes when there is change in the volume of liquids or gases flowing through either of the coupling members causing one of the valve members to move decrementally toward the sealing member which it faces to moderate or prevent the flow of the liquid or gases therethrough;
   f) matching grooves provided in the coupling members and the flexible membrane seated within said matching groove; and
   g) the coupling members having truncated conically shaped passages for the flow of the liquid or gases and the passage in the inlet member being tapered toward the inlet and the passage for the outlet member tapered toward the outlet.

* * * * *

UNITED STATES PATENT AND TRADEMARK OFFICE
CERTIFICATE OF CORRECTION

PATENT NO.   : 5,062,448
DATED        : November 5, 1991
INVENTOR(S)  : Henry Hilsenbeck
               Jack E. Muck It is certified that error appears in the above-identified patent and that said Letters Patent is hereby corrected as shown below:

COLUMN 14:

Claim 1, Line 9, change "seating" to --seated--.

Claim 6, Line 61, change "liquid" to --liquids--.

Signed and Sealed this

Twenty-fifth Day of May, 1993

Attest:

MICHAEL K. KIRK

Attesting Officer           Acting Commissioner of Patents and Trademarks